United States Patent
Sills et al.

(10) Patent No.: US 11,148,392 B1
(45) Date of Patent: Oct. 19, 2021

(54) ENHANCED COMPOSITES VIA SELECTIVE INTERFACIAL MODIFICATION

(71) Applicant: National Technology & Engineering Solutions of Sandia, LLC, Albuquerque, NM (US)

(72) Inventors: Ryan B. Sills, Scotts Valley, CA (US); Timothy Briggs, Brentwood, CA (US); Brian T. Werner, Livermore, CA (US); Stacy Michelle Nelson, Mountain House, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 125 days.

(21) Appl. No.: 16/352,004

(22) Filed: Mar. 13, 2019

(51) Int. Cl.
*B32B 7/022* (2019.01)
*B32B 7/12* (2006.01)

(52) U.S. Cl.
CPC ............ *B32B 7/022* (2019.01); *B32B 7/12* (2013.01); *B32B 2250/03* (2013.01); *B32B 2262/106* (2013.01); *B32B 2307/558* (2013.01)

(58) Field of Classification Search
CPC .... B32B 3/02; B32B 3/06; B32B 3/08; B32B 3/085; B32B 3/10; B32B 3/18; B32B 3/22; B32B 7/022; B32B 7/04; B32B 7/05; B32B 7/12; B32B 7/14; B32B 2250/03; B32B 2250/04; B32B 2250/05; B32B 2250/40; B32B 2250/42; B32B 2262/106; B32B 2307/558; Y10T 428/24033; Y10T 428/24041; Y10T 428/24802; Y10T 428/2481; Y10T 428/24826; Y10T 428/24851; Y10T 428/24983

USPC .... 428/195.1, 198, 201, 203–205, 102, 103, 428/196, 212, 217
See application file for complete search history.

(56) References Cited

U.S. PATENT DOCUMENTS

| 4,350,728 A | * | 9/1982 | Huang | ............. B29C 66/45 428/105 |
| 2018/0304574 A1 | * | 10/2018 | Kozar | ............. B32B 27/36 |

OTHER PUBLICATIONS

Interlaminar Reinforcement of Carbon Fiber Composites from Unidirectional Prepreg Utilizing Aligned Carbon Nanotubes, by Diana Lewis (thesis for Master of Science). Feb. 2016. (Year: 2016).*

(Continued)

*Primary Examiner* — Megha M Gaitonde
(74) *Attorney, Agent, or Firm* — Medley, Behrens & Lewis, LLC (57) ABSTRACT

A laminate comprising a first ply, a second ply, and a third ply which sandwiching the second ply between the first ply and the third ply. The laminate further includes a first plurality of interfacial modifiers arranged between opposing faces of the first ply and the second ply. The first plurality of interfacial modifiers are arranged in a first pattern. The laminate includes a second plurality of interfacial modifiers arranged between opposing faces of the second ply and the third ply such that the first plurality of interfacial modifiers and the second plurality of interfacial modifiers are arranged on opposite faces of the second ply. The second plurality of interfacial modifiers are arranged in a second pattern. The first pattern and the second pattern are configured to increase crack growth resistance of the laminate by selectively toughening portions of the laminate to control propagation of interfacial cracks within the laminate.

20 Claims, 5 Drawing Sheets

(56) References Cited

OTHER PUBLICATIONS

Furlotti, et al., "Numerical Assessment of Impact Behavior of Composite Laminates with Variable Interply Delamination Strength", Procedia Materials Science, vol. 3 (2014), pp. 1467-1472.

Yasaee, et al., "Mode I Interfacial Toughening Through Discontinuous Interleaves for Damage Suppression and Control", Composites Part A: Applied Science and Manufacturing, vol. 43, Issue 1, Jan. 2012, pp. 198-207.

Yasaee, et al., "Mode II Interfacial Toughening Through Discontinuous Interleaves for Damage Suppression and Control", Composites Part A: Applied Science and Manufacturing, vol. 43, Issue 1, Jan. 2012, pp. 121-128.

Zhang, et al., "Fabrication of Patterned Thermoplastic Microphases Between Composite Plies by Inkjet Printing", Journal of Composite Materials, vol. 49, Issue 15, Jun. 2015, pp. 1-10.

\* cited by examiner

ENHANCED COMPOSITES VIA SELECTIVE INTERFACIAL MODIFICATION

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

A composite laminate is a multi-layer product, with layers of fibrous fabric with matrix material encapsulating and bonding the plies together. Conventionally, as the composite laminate is assembled characteristics of the composite laminate, such as crack growth resistance, are determined by the materials used. Controlling characteristics of the composite laminate is currently limited to changing the type of weave architecture, fiber or matrix material used, and/or the orientation with which each ply layer is placed.

SUMMARY

The following is a brief summary of subject matter that is described in greater detail herein. This summary is not intended to be limiting as to the scope of the claims.

In an exemplary embodiment, provided is a laminate comprising a first ply, a second ply, and a third ply sandwiching the second ply between the first ply and the third ply. The laminate further includes a first plurality of interfacial modifiers arranged between opposing faces of the first ply and the second ply. The first plurality of interfacial modifiers are arranged in a first pattern. The laminate includes a second plurality of interfacial modifiers arranged between opposing faces of the second ply and the third ply such that the first plurality of interfacial modifiers and the second plurality of interfacial modifiers are arranged on opposite faces of the second ply. The second plurality of interfacial modifiers are arranged in a second pattern. The first pattern and the second pattern are configured to increase crack growth resistance of the laminate by selectively toughening portions of the laminate to control propagation of interfacial cracks within the laminate.

In another aspect, the laminate can include a fourth ply sandwiching the third ply between the second ply and the fourth ply. The laminate can further include a third plurality of interfacial modifiers between opposing faces of the third ply and the fourth ply. The third plurality of third interfacial modifiers are arranged in a third pattern. The third pattern is configured to further increase crack growth resistance of the laminate by selectively toughening portions of the laminate to control propagation of interfacial cracks within the laminate.

A method of forming a laminate includes the step of defining a first pattern for placement of a first plurality of interfacial modifiers between a first ply and a second ply of a laminate. The method further includes the step of defining a second pattern for placement of a second plurality of interfacial modifiers between the second ply and a third ply of the laminate. The second ply interposes the first ply and the third ply. The first pattern and the second pattern are configured to increase crack growth resistance of the laminate by selectively toughening a portion of the laminate to control propagation of interfacial cracks within the laminate. The method yet further includes the step of placing the first plurality of interfacial modifiers between opposing faces of the first ply and the second ply according to the first pattern. The method also includes the step of placing the second plurality of interfacial modifiers between opposing faces of the second ply and the third ply according to the second pattern.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a composite laminate are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is a modifier or plurality of modifiers used in a composite laminate to control interlaminar delamination resulting from lamination defects (e.g., cracks) introduced during manufacturing (e.g., stray release film, porosity, resin-starved regions, machining damage), intentional inclusions (e.g., embedded sensors such as strain gages, thermocouples, fiber optics, accelerometers, etc.), and/or by routine handling issues (e.g., mechanical shock, temperature/humidity exposure, abrasion, tool drop). The modifier can increase crack growth resistance of the composite laminate, as will be described in detail below. The modifier may be placed in any suitable position within the composite laminate. In the following embodiments, the modifier comprises an interfacial modifier that is placed in an interface between two plies.

A composite laminate can be considered as a multilayer sandwich alternating between plies and layers of matrix material bonding the plies together. As the composite laminate is manufactured, certain baseline characteristics are set based on the material used, such as a toughness. Toughness is the ability of the composite laminate to resist the growth of cracks. Toughness of the composite laminate can be based on the ply material used, matrix material used, number of plies, orientation of each ply layer, and/or the like. Conventionally, composite laminates are designed in the through-thickness direction. The sequence different plies are stacked in is used to control properties of the composite laminate. For instance, the plies may be oriented in a specific direction to increase strength of the composite laminate in that direction.

Damage to the composite laminate can lead to toughening. Delamination is a mode of damage/failure in composite laminates. It is commonly caused by lamination defects (e.g., cracks) introduced during manufacturing (e.g., stray release film, porosity, resin-starved regions, machining damage) and/or by routine handling issues (e.g., mechanical shock, temperature/humidity exposure, abrasion, tool drop). As the lamination defect propagates through the composite laminate it can cause portions of the laminate to separate.

Interlaminar delamination occurs when a crack grows along an interface between two adjacent plies of the composite. This is compared to intralaminar fracture which occurs when a crack grows within a ply or multiple plies of the composite. Crack extension occurs when the driving force for crack growth, often expressed in terms of the strain energy release rate or the J-integral, exceeds a material's resistance to crack extension, a.k.a. the material's toughness. A plot of the material's toughness compared with crack length is called a crack resistance curve, or R-curve. The subject matter described herein can be used to control in-plane properties of interfaces between plies to increase crack growth resistance of the composite laminate as the crack grows.

More specifically, through strategic insertion of interfacial modifiers, the composite laminate can be designed to increase in toughness, or resistance to crack growth, as the defect grows. These interfacial modifiers may spread the damage at the crack tip through the composite laminate such that in order for a single macroscopic defect to grow, multiple microscopic defects must grow. By increasing the number of microscopic cracks that are simultaneously propagating, the disclosed pattern of interfacial modifiers can result in a steeper R-curve of the composite laminate for each unit of macroscopic crack growth (i.e. the composite laminate becomes tougher quicker) than a resulting R-curve for a single crack propagating in a single interface of the same composite laminate.

The interfacial modifiers may be placed in a pattern that is configured to leverage the intrinsic toughness of the laminate, which is defined herein as the amount of energy necessary to separate multiple interfaces in a composite laminate. The interfacial modifier can have a toughness that is different from the toughness of the matrix material that is used in the interface. For instance, the interfacial modifier can have a toughness higher than the toughness of the matrix material.

By selectively toughening a portion of a first interface, via an inserted interfacial modifier, as compared to a parallel portion of a second interface, the interfacial modifier may force the crack to form a new crack in the second interface, i.e., jump from the first interface to the second interface.

By forcing the crack to jump from one interface to another interface to continue propagation the intrinsic toughness of the composite laminate can be leveraged to steepen the R-curve of the composite laminate. As the cracks in the different interfaces propagate the amount of energy dissipated increases with each new crack. For instance, where two cracks are formed, for each unit of overall crack extension the energy dissipated is at least twofold. In another instance, where ten cracks are formed, for each unit of overall crack extension the energy dissipated is at least tenfold. Thus, by increasing the amount cracks that are simultaneously propagating the disclosed pattern of interfacial modifiers can cause the R-curve of the composite laminate to steepen quicker than for a single crack propagating in a single interface.

Figure 1:
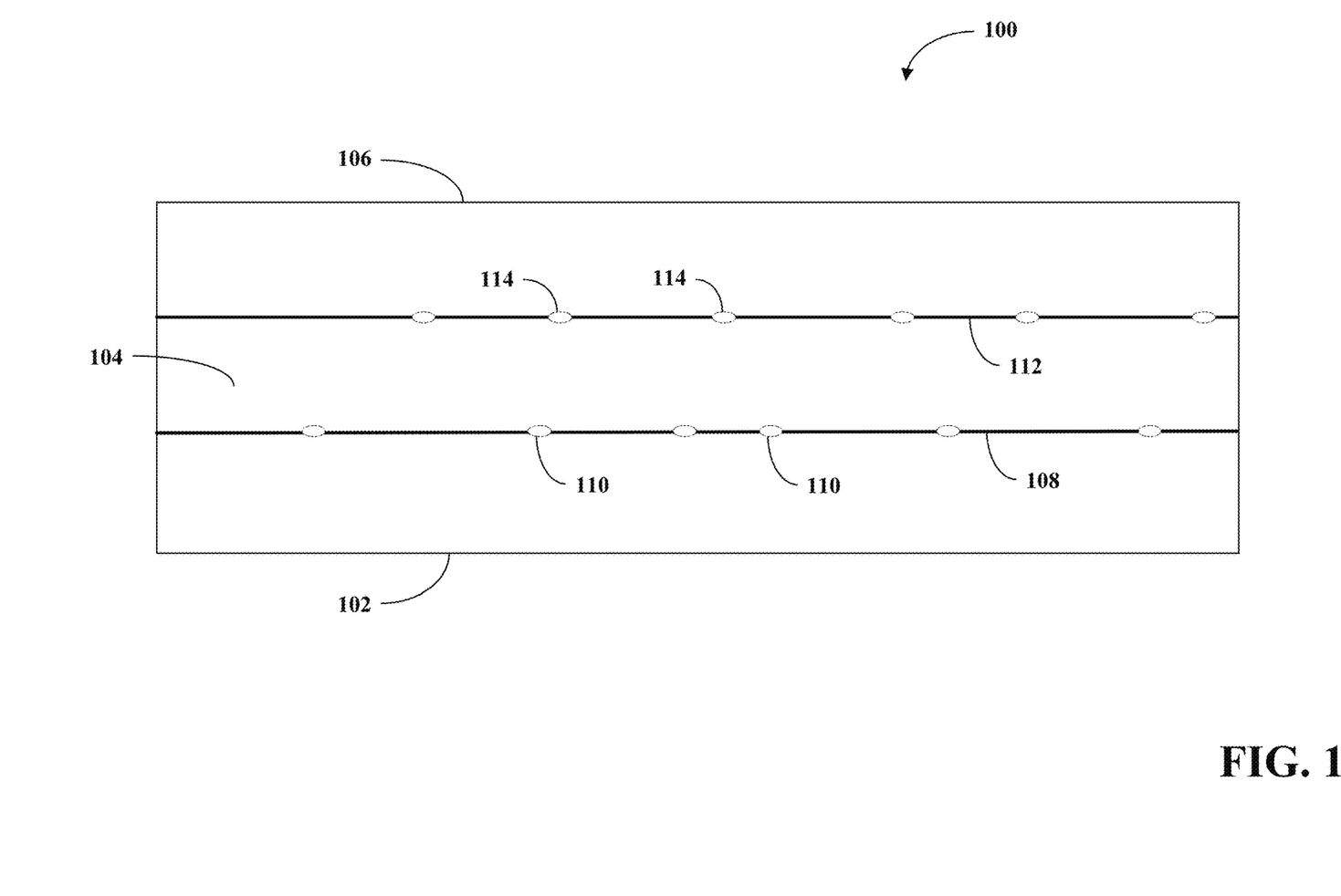
FIG. 1 illustrates an exemplary composite laminate.

Turning to FIG. 1, illustrated is one embodiment of a composite laminate 100. The composite laminate 100 comprises a plurality of plies that are stacked on top of each other that are then bonded to one another to form a single unit. In one embodiment, illustrated in FIG. 1, the composite laminate 100 comprises a first ply 102, a second ply 104, and a third ply 106 that are bonded together one on top of the other. Although the illustrated composite laminate 100 includes three plies, any suitable number of plies may be employed, e.g. five plies, one hundred plies, etc. Each ply is made of a suitable material, such as high-modulus and/or high-strength fibers. The fiber can include aramid, cellulose, graphite, glass, boron, silicon carbide, and/or the like. A plurality of fibers may be woven together to form the ply and/or a plurality of non-woven fibers may be used to form the ply. The same material(s) may be used for each ply of the laminate or different material may be used.

The plies can then be bound together by curing a matrix material between and within each ply. Any suitable method may be used for introducing the matrix material into the composite laminate 100. For instance, one or more ply of the plurality of plies may be pre-impregnated with the matrix material. In another example, the matrix material may be transferred into a stack of plies via vacuum. In a further example, the matrix material may be manually applied to each ply.

The matrix material may be polymeric, metallic, and/or ceramic. For instance, the matrix material can include epoxies, polyimides, aluminum, titanium, alumina, and/or the like. The same matrix material may be used throughout the composite laminate 100 and/or different matrix materials can be used in different layers of the composite laminate 100.

The composite laminate 100 can further include a plurality of interfacial modifiers arranged in a pattern. For instance, illustrated in FIG. 1, a first plurality of interfacial modifiers 110 can be placed in an interface 108 between opposing faces of the first ply 102 and the second ply 104 and a second plurality of interfacial modifiers 114 can be placed in an interface between opposing faces of the second ply 104 and the third ply 106. Each interfacial modifier of the plurality of interfacial modifiers can have a material characteristic (e.g., toughness, strength, strain to failure, stiffness, etc.) that is different from a material characteristic of the matrix material used in the interface. For instance, the interfacial modifier can have a toughness higher than the toughness of the matrix material.

The plurality of interfacial modifiers 110 may be placed in the interface in a pattern that is configured to control crack development within the interface. The pattern is calculated to control propagation of a potential crack that develops within one or more interfaces of the composite laminate 100, as will be explained in detail below. The pattern may be based on any number of factors, including the interfacial modifier material, the ply material, the interfacial matrix material, external stresses that will be placed on the laminate composite 100 in the field, the number of plies, and/or the like. For instance, a first number of interfacial modifiers may be placed in an area of the composite laminate 100 subject to high interlaminar stresses in a thickness direction of the composite laminate 100, e.g., where the composite laminate 100 is subjected to out-of-plane tension, while a second number of interfacial modifiers may be placed in an area where the composite laminate 100 experiences lower interlaminar stresses, e.g., the composite laminate 100 is subjected to in-plane shear stress, wherein the first number is greater than the second number.

The overall pattern of interfacial modifiers within the composite laminate 100 can be calculated based on any suitable method. For instance, a computer simulation may be used to predict crack propagation within a simulated composite laminate 100 based on different patterns to determine which pattern will result in the steepest R-curve. The computer simulation can be performed for different portions of the composite laminate 100 (e.g., one interface at a time, a segment of the entire thickness, etc.) or can be performed for the whole composite laminate 100.

Any suitable method may be used for placing the interfacial modifiers in the interface. For instance, a printer head can be used to selectively apply the first plurality of interfacial modifiers 110 to a surface of the first ply 102 according to the predefined pattern. The second ply 104 can then be aligned with this surface of the first ply and joined thereto to form the composite laminate 100. The same printer head or a different printer head can be used to selectively apply the second plurality of interfacial modifiers 114 to a surface of the second ply 104 that is opposite the surface facing the first ply 102. The second plurality of interfacial modifiers 114 can be applied to the second ply 104 before and/or after the second ply 104 is placed on the first ply 102.

As is illustrated in FIG. 1, the first plurality of interfacial modifiers 110 can be arranged in a first pattern and the second plurality of interfacial modifiers 114 can be arranged in a second pattern. The first pattern and the second pattern can be different or can include portions that are substantially similar. For instance, the second pattern can be designed such that none of the interfacial modifiers in the second plurality of interfacial modifiers 114 overlap with interfacial modifiers of the first plurality of interfacial modifiers 110 in the final composite laminate 100 product. Each pattern may vary in density across their respective interface. For instance, where the first interface experiences a higher strain level than the second interface experiences for the same area, the density of interfacial modifiers may be higher in the first interface than the second interface.

Figure 2:
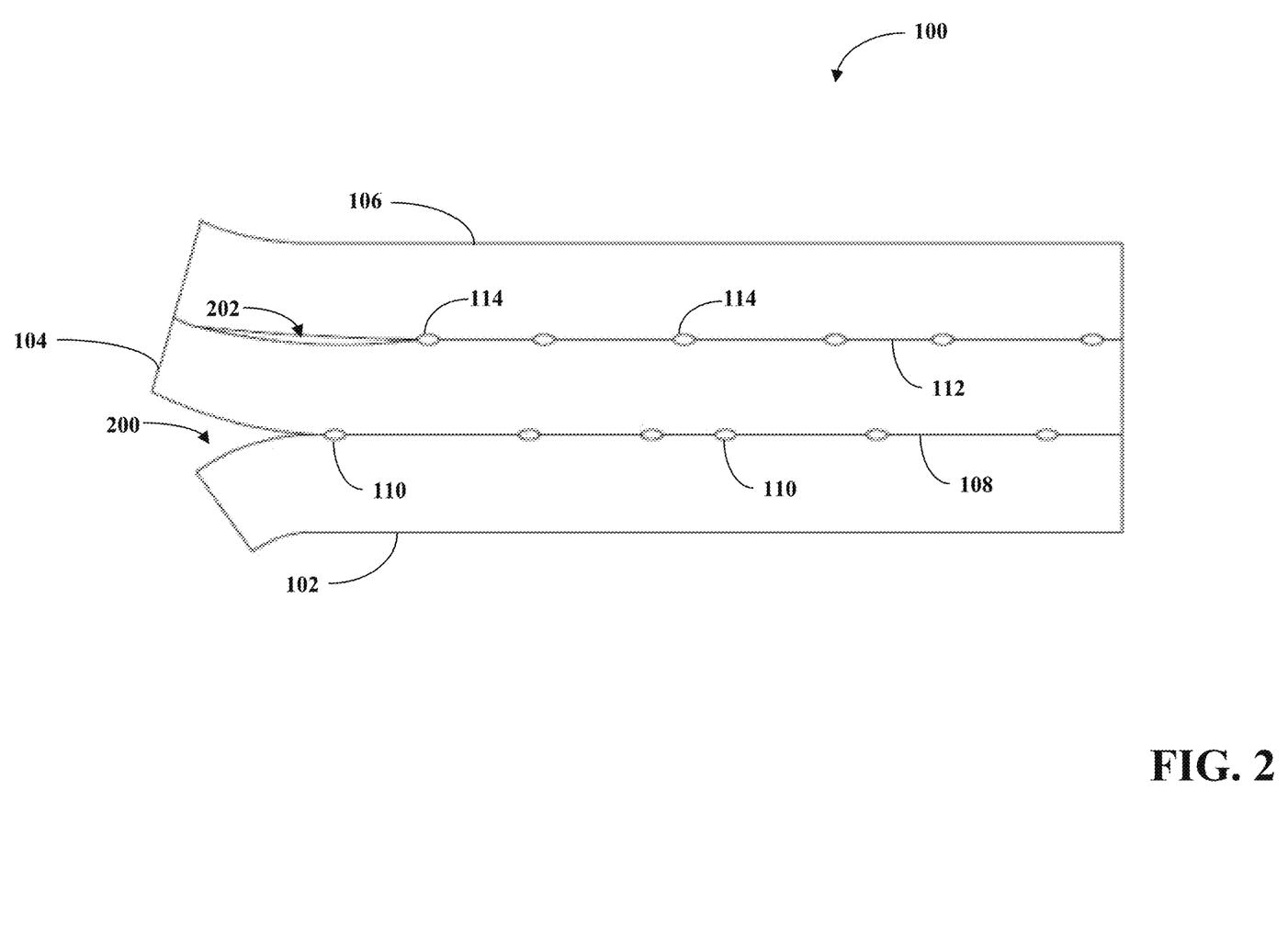
FIG. 2 illustrates another exemplary composite laminate.

As shown in FIG. 2, the first pattern can be configured to cause a crack 200 propagating in the first interface 108 to jump to the second interface 112 when the crack 200 reaches one of the first plurality of interfacial modifiers 110. As illustrated, this jump causes two cracks to form in the composite laminate 100, the crack 200 in the first interface 108 and a second crack 202 in the second interface 112. As the crack 202 propagates along the second interface 112 it may reach an interfacial modifier of the second plurality of interfacial modifiers 114 which could cause the crack to jump back down to the first interface 108. This jump down would result in three cracks propagating through the composite laminate 100, two separate cracks in the first interface 108 and one crack in the second interface 112. The first pattern and the second pattern can be configured to cause cracks to jump back and forth between the first interface 108 and the second interface 112 creating a multitude of cracks.

The overall pattern of interfacial modifiers in the composite laminate 100 can be further configured to direct crack propagation. For instance, the pattern can be configured to steer crack propagation away from a certain area and/or toward a certain area. For example, the pattern can be configured to direct crack propagation away from areas of the composite laminate 100 subject to high tensile stress and toward areas of lower tensile stress.

Figure 3:
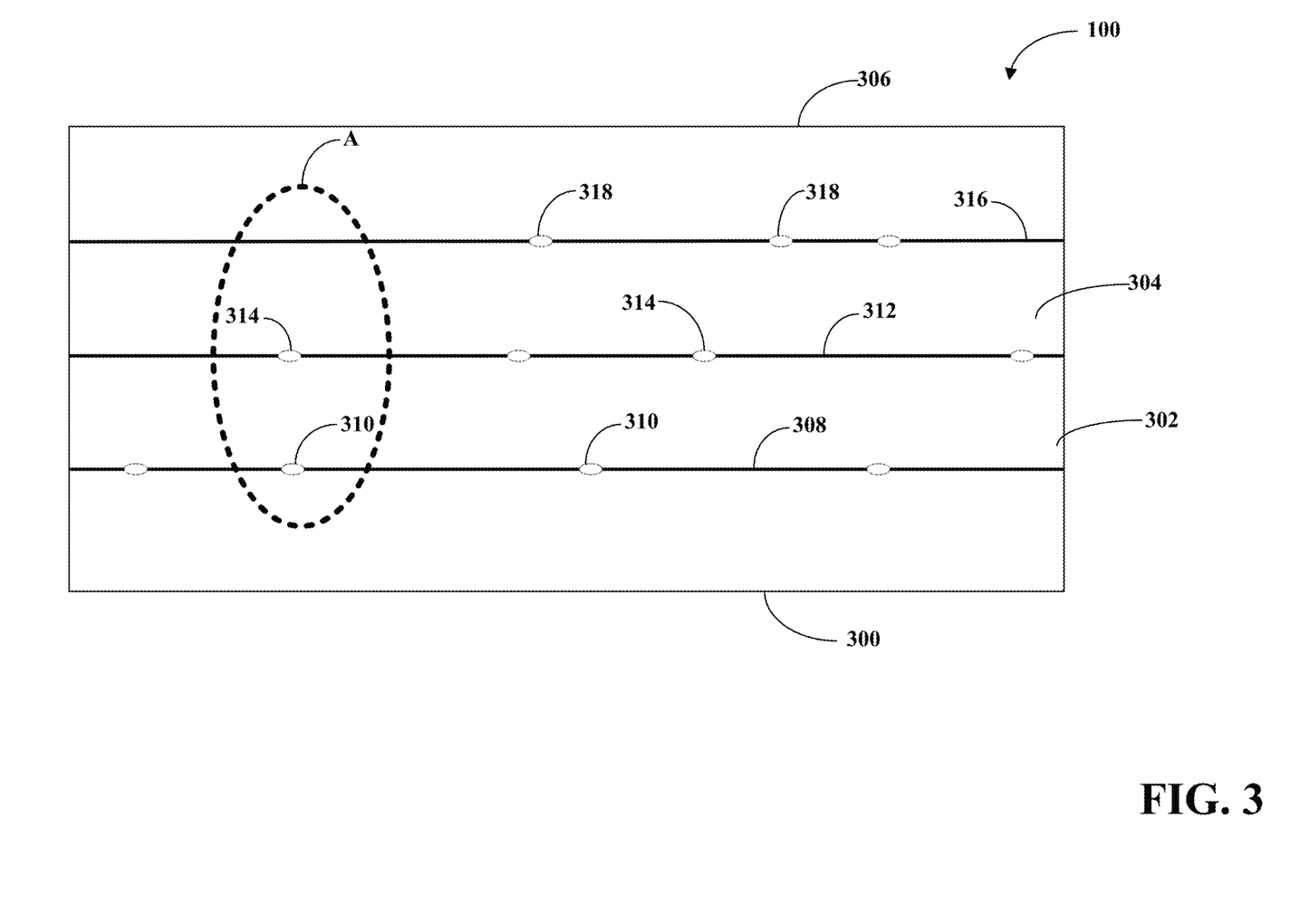
FIG. 3 illustrates yet another exemplary composite laminate.
Figure 4:
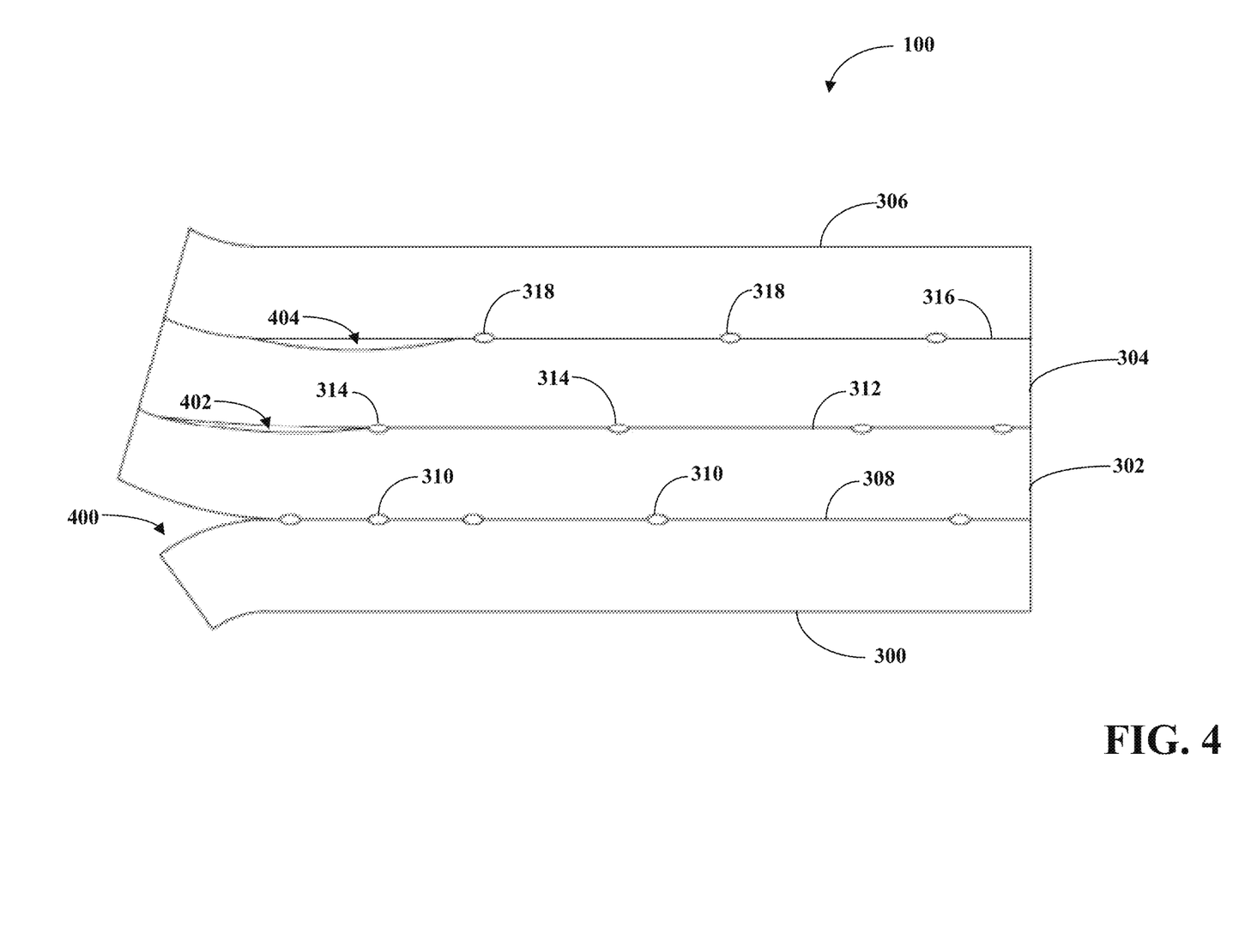
FIG. 4 illustrates a further exemplary composite laminate.

In another example, the pattern can be configured to direct which interface a crack can jump to when the crack reaches an interfacial modifier. FIGS. 3 and 4 illustrate an embodiment of this concept of directing crack propagation. FIG. 3 illustrates an embodiment of a composite laminate 100 with a first ply 300, a second ply 302, a third ply 304, and a fourth ply 306. A different pattern may be employed in each of several different interfaces 308, 312, 316 to direct which interface the crack jumps to. For instance, a first pattern for a first plurality of interfacial modifiers 310 in the interface 308 between the first ply 300 and the second ply 302; a second pattern for a second plurality of interfacial modifiers 314 in the interface 312 between the second ply 302 and the third ply 304; and a third pattern for a third plurality of interfacial modifiers 318 in the interface 316 between the third ply 304 and the fourth ply 306. The patterns can be configured with respect to each other to control crack propagation across the three different interfaces.

For instance, an interfacial modifier of the first plurality of interfacial modifiers 310 and an interfacial modifier of the second plurality of interfacial modifiers 314 can be substantially aligned on opposite sides of the second ply 302, as indicated in area "A" of FIG. 3. This alignment can control which direction a crack jumps in. More specifically, as shown in FIG. 4, the interfacial modifiers of the first plurality of interfacial modifiers 310 and the interfacial modifiers of the second plurality of interfacial modifiers 314 can be aligned such that a crack 402 propagating along the second interface 312 would be more likely to jump to the third interface 316 to form another crack 404 than to the first interface 308 to continue propagation when the crack 402 reaches the aligned interfacial modifier in the second interface. This aligning of interfacial modifiers can be repeated through a thickness of the composite laminate 100 to direct crack jumps upward and/or downward through the thickness of the composite laminate 100. In an embodiment, the crack 402 in the second interface 312 can form when a crack 400 in the first interface 308 jumps up to the second interface 312. In another embodiment, the crack 402 in the second interface may have originated from the initial crack tip.

The interfacial modifiers described above may be made of any suitable material. For instance, in one embodiment, the interfacial modifier can comprise one or more of carbon nanofibers, carbon nanotubes, secondary resins, interleaved polymeric films, second phase particles, z-pins, or stitches. The same material can be used for all the interfacial modifiers in the composite laminate 100 or the material may vary.

Figure 5:
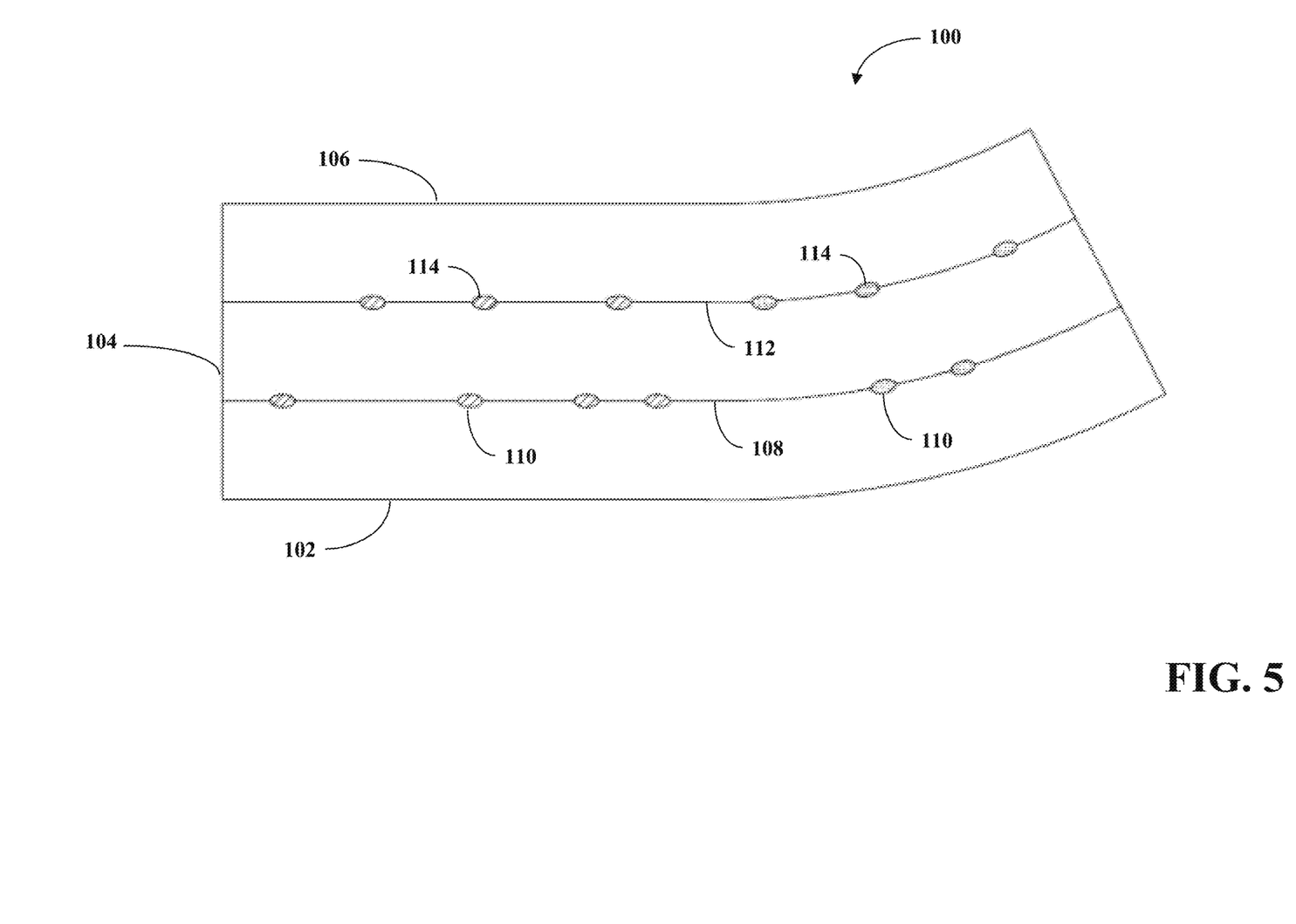
FIG. 5 illustrates a yet further exemplary composite laminate.

Additionally, or alternatively, one or more material characteristic (e.g., toughness, strength, strain to failure, stiffness, etc.) may be shared by the interfacial modifiers or the material characteristic can vary. Different characteristics may be desired for different portions of the laminate. For example, as illustrated in FIG. 5, a material with a first toughness may be used for interfacial modifiers in an area of the composite laminate 100 subject to high tensile stress, e.g., where the composite laminate 100 is subjected to out-of-plane loading. A material with a second, lower toughness may be used for interfacial modifiers in an area of the composite laminate 100 subject to lower tensile stress.

Once the pattern of interfacial modifiers is applied to an interface between two plies of composite laminate 100, described above, the plies can be bonded together via any conventional method. For instance, a vacuum bag can be used to press the plies together as the composite laminate 100 cures. Alternatively, an autoclave and a vacuum bag can be used together to press the plies together while the composite laminate 100 cures.

In addition to selectively steepening an R-curve of a composite laminate 100 and/or controlling crack propagation in the composite laminate 100, the described concept of strategically inserting modifiers between plies of a composite laminate 100 can be used to control other properties of the composite laminate 100. For instance, interfacial modifiers can be placed in a pattern that is configured to minimize the distance a projectile penetrates a composite laminate 100. In another example, interfacial modifiers can be placed in a pattern that is configured to minimize and/or control force transmitted across a composite laminate 100. The described concept can also be used to insert sensors into the composite laminate 100 to monitor different properties of the composite laminate 100 (e.g., stress experienced, presence of a defect, temperature, etc.) without causing delamination to propagate within the composite laminate 100.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A laminate comprising:
    a first ply;
    a second ply;
    a third ply, wherein the second ply is interposed between the first ply and the third ply;
    matrix material that encapsulates the first ply, the second ply, and the third ply, wherein the matrix material between the first ply and the second ply directly bonds opposing faces of the first ply and the second ply together, wherein the matrix material between the second ply and the third ply directly bonds opposing faces of the second ply and the third ply together, wherein the matrix material comprises:
        a first plurality of interfacial modifiers arranged in the matrix material wholly between the first ply and the second ply, wherein the first plurality of interfacial modifiers are arranged in a first pattern; and
        a second plurality of interfacial modifiers arranged in the matrix material wholly between the second ply and the third ply such that the first plurality of interfacial modifiers and the second plurality of interfacial modifiers are arranged on opposite faces of the second ply, wherein the second plurality of interfacial modifiers are arranged in a second pattern,
    wherein the first pattern and the second pattern are configured to increase toughness of the laminate by:
        increasing resistance of crack growth in the matrix material between the first ply and the second ply; and
        increasing resistance of crack growth in the matrix material between the second ply and the third ply, such that a crack, rather than growing in the matrix material between the first ply and the second ply, transitions from the matrix material between the first ply and the second ply to the matrix material between the second ply and the third ply upon the crack reaching an interfacial modifier in the matrix material between the first ply and the second ply.

2. The laminate of claim 1, wherein a first interfacial modifier of at least one of the first plurality of interfacial modifiers or the second plurality of interfacial modifiers comprises a first material, wherein a second interfacial modifier of the same plurality of interfacial modifiers comprises a second material, wherein the second material is different from the first material, wherein the first material has a first material characteristic and the second material has a second material characteristic different from the first material characteristic.

3. The laminate of claim 2, wherein the first material has a first toughness, wherein the second material has a second toughness, wherein the second toughness is lower than the first toughness.

4. The laminate of claim 3, wherein the first interfacial modifier comprising the first material is located at a point where the laminate is anticipated to experience a first tensile stress, wherein the second interfacial modifier comprising the second material is located at a point where the laminate is anticipated to experience a second tensile stress, wherein the first tensile stress is higher than the second tensile stress.

5. The laminate of claim 1, wherein the second pattern is different from the first pattern.

6. The laminate of claim 1, wherein a first interfacial modifier of the first plurality of interfacial modifiers is made of a first material, wherein a second interfacial modifier of the second plurality of interfacial modifiers is made of a second material, wherein the first material and the second material are different.

7. The laminate of claim 1, wherein the first pattern and the second pattern are defined such that first plurality of interfacial modifiers and the second plurality of interfacial modifiers are non-overlapping.

8. The laminate of claim 1, wherein the first pattern and the second pattern are determined as a function of increasing an amount of energy dissipated per unit of overall crack extension.

9. The laminate of claim 1, wherein the first pattern and the second pattern are further configured to increase projectile penetration resistance of the laminate.

10. The laminate of claim 1, further comprising:
    a fourth ply, wherein the third ply is interposed between the second ply and the fourth ply, wherein the matrix material further encapsulates the fourth ply, wherein the matrix material between the third ply and the fourth ply directly bonds opposing faces of the third ply and the fourth ply together, wherein the matrix material further comprises:
a third plurality of interfacial modifiers in the matrix material between the third ply and the fourth ply, wherein the third plurality of interfacial modifiers are arranged in a third pattern, wherein the third pattern is configured to further increase toughness of the laminate by increasing resistance of crack growth in the matrix material between the third ply and the fourth ply, such that a second crack, rather than growing in the matrix material between the third ply and the fourth ply, transitions from the matrix material between the third ply and the fourth ply to the matrix material between the second ply and the third ply upon the second crack reaching an interfacial modifier in the third plurality of interfacial modifiers.

11. The laminate of claim 10, wherein the third pattern is different from at least one of the first pattern or the second pattern.

12. The laminate of claim 1, wherein a first interfacial modifier of the first plurality of interfacial modifiers comprises a carbon nanofiber.

13. A method for forming a laminate comprising:
defining a first pattern for placement of a first plurality of interfacial modifiers between a first ply and a second ply of a laminate;
defining a second pattern for placement of a second plurality of interfacial modifiers between the second ply and a third ply of the laminate, wherein the second ply interposes the first ply and the third ply, wherein the first pattern and the second pattern are configured to increase toughness of the laminate by:
increasing resistance of crack growth in a matrix material between the first ply and the second ply; and
increasing resistance of crack growth in a matrix material between the second ply and the third ply, such that a crack, rather than growing in the matrix material between the first ply and the second ply, transitions from the matrix material between the first ply and the second ply to the matrix material between the second ply and the third ply upon the crack reaching an interfacial modifier in the matrix material between the first ply and the second ply;
placing the first plurality of interfacial modifiers between opposing faces of the first ply and the second ply according to the first pattern without the first plurality of interfacial modifiers extending into either the first ply or the second ply;
placing the second plurality of interfacial modifiers between opposing faces of the second ply and third ply without the second plurality of interfacial modifiers extending into either the second ply or the third ply, such that first plurality of interfacial modifiers and the second plurality of interfacial modifiers are arranged on opposite faces of the second ply; and
encapsulating the laminate with the matrix material, wherein encapsulating the laminate comprises encapsulating the first ply, the second ply, and the third ply with the matrix material, wherein the first plurality of interfacial modifiers are arranged in the matrix material between the opposing faces of the first ply and the second ply, wherein the matrix material between the first ply and the second ply directly bonds the opposing faces of the first ply and the second ply together, wherein the second plurality of interfacial modifiers are arranged in the matrix material between the opposing faces of the second ply and the third ply, wherein the matrix material between the second ply and the third ply directly bonds the opposing faces of the second ply and the third ply together.

14. The method of claim 13, further comprising:
defining a third pattern for placement of a third plurality of interfacial modifiers between the third ply and a fourth ply of the laminate, wherein the third pattern is configured to further increase toughness of the laminate by increasing resistance of crack growth in the matrix material between the third ply and the fourth ply, such that a second crack, rather than growing in the matrix material between the third ply and the fourth ply, transitions from the matrix material between the third ply upon the fourth ply to the matrix material between the second ply and the third ply upon the second crack reaching an interfacial modifier in the matrix material between the third ply and the fourth ply; and
placing the third plurality of interfacial modifiers between opposing faces of the third ply and the fourth ply according to the third pattern, wherein encapsulating the laminate further comprises encapsulating the fourth ply with the matrix material, wherein the third plurality of interfacial modifiers are arranged in the matrix material between the opposing faces of the third ply and the fourth ply, wherein the matrix material between the third ply and the fourth ply directly bonds the opposing faces of the third ply and the fourth ply together.

15. The method of claim 14, wherein the third pattern is different from at least one of the first pattern or the second pattern.

16. The method of claim 13, wherein a first interfacial modifier of the first plurality of interfacial modifiers comprises a first material, wherein a second interfacial modifier of the second plurality of interfacial modifiers comprises a second material, wherein the first material and the second material are different.

17. The method of claim 13, wherein the first pattern and the second pattern are determined as a function of increasing an amount of energy dissipated per unit of overall crack extension.

18. A laminate comprising:
a first ply;
a second ply;
a third ply, wherein the second ply is interposed between the first ply and the third ply;
a fourth ply, wherein the third ply is interposed between the second ply and the fourth ply;
matrix material that encapsulates the first ply, the second ply, the third ply, and the fourth ply, wherein the matrix material between the first ply and the second ply directly bonds opposing faces of the first ply and the second ply together, wherein the matrix material between the second ply and the third ply directly bonds opposing faces of the second ply and the third ply together, wherein the matrix material between the third ply and the fourth directly bonds opposing faces of the third ply and the fourth ply together;
a first plurality of interfacial modifiers arranged in the matrix material wholly between the first ply and the second ply, wherein the first plurality of interfacial modifiers are arranged in a first pattern;
a second plurality of interfacial modifiers arranged in the matrix material wholly between the second ply and the third ply such that the first plurality of interfacial modifiers and the second plurality of interfacial modifiers are arranged on opposite faces of the second ply, wherein the second plurality of interfacial modifiers are arranged in a second pattern; and a third plurality of interfacial modifiers arranged in the matrix material wholly between the third ply and the fourth ply such that the second plurality of interfacial modifiers and the third plurality of interfacial modifiers are arranged on opposite faces of the third ply, wherein the third plurality of interfacial modifiers are arranged in a third pattern, wherein the first pattern, the second pattern, and the third pattern are configured to increase toughness of the laminate by:

increasing resistance of crack growth in the matrix material between the first ply and the second ply;

increasing resistance of crack growth in the matrix material between the second ply and the third ply; and increasing resistance of crack growth in the matrix material between the third ply and the fourth ply, such that:

a first crack, rather than growing in the matrix material between the first ply and the second ply, transitions from the matrix material between the first ply and the second ply to the matrix material between the second ply and the third ply upon the first crack reaching a first interfacial modifier in the matrix material between the first ply and the second ply; and a second crack, rather than growing in the matrix material between the second ply and the third ply, transitions from the matrix material between the second ply and the third ply to the matrix material between the third ply and the fourth ply upon the second crack reaching a second interfacial modifier in the matrix material between the second ply and the third ply.

19. The laminate of claim 18, wherein the first pattern and the second pattern are configured to align a third interfacial modifier of the first plurality of interfacial modifiers and a fourth interfacial modifier of the second plurality of interfacial modifiers on opposing faces of the second ply.

20. The laminate of claim 18, wherein a third interfacial modifier of the first plurality of interfacial modifiers is made of a first material, wherein a fourth interfacial modifier of the second plurality of interfacial modifiers is made of a second material, wherein a fifth interfacial modifier of the third plurality of interfacial modifiers is made of a third material, wherein the third material is different from at least one of the first material or the second material.

* * * * *